United States Patent
Kim et al.

(10) Patent No.: US 12,368,179 B2
(45) Date of Patent: Jul. 22, 2025

(54) ELECTRODE CONNECTING DEVICE, ELECTRODE CONNECTING METHOD, AND NOTCHING MACHINE COMPRISING SAME

(71) Applicant: LG Energy Solution, Ltd., Seoul (KR)

(72) Inventors: Yoong Kim, Daejeon (KR); Yun Ho Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 496 days.

(21) Appl. No.: 17/927,540

(22) PCT Filed: Jan. 7, 2022

(86) PCT No.: PCT/KR2022/000292
§ 371 (c)(1),
(2) Date: Nov. 23, 2022

(87) PCT Pub. No.: WO2022/149903
PCT Pub. Date: Jul. 14, 2022

(65) Prior Publication Data
US 2023/0207858 A1 Jun. 29, 2023

(30) Foreign Application Priority Data

Jan. 11, 2021 (KR) .................. 10-2021-0003615
Jan. 5, 2022 (KR) .................. 10-2022-0001809

(51) Int. Cl.
*H01M 10/04* (2006.01)
*H01M 50/533* (2021.01)

(52) U.S. Cl.
CPC ... *H01M 10/0404* (2013.01); *H01M 10/0486* (2013.01); *H01M 50/533* (2021.01)

(58) Field of Classification Search
CPC ......... H01M 10/0404; H01M 10/0486; H01M 50/533; H01M 4/0404; B65H 2301/46176;
(Continued)

(56) References Cited

U.S. PATENT DOCUMENTS 6,296,248 B1   10/2001   Tanaka
2015/0090389 A1   4/2015   Min et al.

FOREIGN PATENT DOCUMENTS

CN   104718654 A   6/2015
EP     2879223 A1   6/2015
(Continued)

OTHER PUBLICATIONS

Kang et al., KR 101695650 B1, Espacenet machine translation, 2016 (Year: 2016).*

(Continued)

*Primary Examiner* — Adam A Arciero
(74) *Attorney, Agent, or Firm* — Lerner David LLP

(57) ABSTRACT

An electrode connecting device for connecting an end of a preceding sheet to an end of a succeeding sheet includes: an arrangement member provided with an arrangement part on which the end of the preceding sheet is located adjacent to or overlapping with the end of the succeeding sheet; and a guide member having a guide bar which is provided movable between a support position to support a side portion of the preceding sheet and a side portion of the succeeding sheet during connecting of the end of the preceding sheet to the end of the succeeding sheet and a retreat position not to interfere with movements of the preceding sheet and the succeeding sheet.

15 Claims, 13 Drawing Sheets

(58) Field of Classification Search
CPC .... B65H 2301/4622; B65H 2301/4631; B65H 2404/732; B65H 2406/351; B65H 19/1852; B26D 1/085; Y02E 60/10; Y02P 70/50; B26F 1/12
See application file for complete search history.

(56) References Cited

FOREIGN PATENT DOCUMENTS

| | | | |
|---|---|---|---|
| JP | 2000185846 | A | 7/2000 |
| KR | 100659773 | B1 | 12/2006 |
| KR | 100819183 | B1 | 4/2008 |
| KR | 20130073300 | A | 7/2013 |
| KR | 101342711 | B1 | 12/2013 |
| KR | 20150035271 | A | 4/2015 |
| KR | 101561445 | B1 | 10/2015 |
| KR | 101695650 | B1 | 1/2017 |
| KR | 20190108750 | A | 9/2019 |
| KR | 102080346 | B1 | 2/2020 |
| KR | 20200070921 | A | 6/2020 |
| KR | 102192068 | B1 | 12/2020 |

OTHER PUBLICATIONS

EESR for Application No. 22736880.0 dated Mar. 6, 2024. 5 pgs.
International Search Report for PCT/KR2022/000292 mailed Apr. 14, 2022. 3 pgs.

* cited by examiner

ELECTRODE CONNECTING DEVICE, ELECTRODE CONNECTING METHOD, AND NOTCHING MACHINE COMPRISING SAME

CROSS-REFERENCE TO RELATED APPLICATIONS

The present application is a national phase entry under 35 U.S.C. § 371 of the International Application No. PCT/KR2022/000292 filed on Jan. 7, 2022, which claims priority from Korean Patent Application Nos. 10-2021-0003615, filed on Jan. 11, 2021, and 10-2022-0001809, filed on Jan. 5, 2022, the disclosures of which are incorporated herein by reference in their entireties.

FIELD OF THE INVENTION

The present invention relates to an electrode connecting device capable of aligning and connecting two sheets (or films) in a longitudinal direction, an electrode connecting method, and a notching machine comprising same.

BACKGROUND OF THE INVENTION

Generally, secondary batteries refer to chargeable and dischargeable batteries unlike primary batteries that are not chargeable. Such a secondary battery is being widely used in phones, laptop computers, camcorders, electric vehicles, and the like.

The secondary battery comprises an electrode assembly and a case that accommodates the electrode assembly, and the electrode assembly has a structure in which electrodes and separators are alternately stacked. Here, the electrode tab is formed at each of the electrodes.

Also, the electrode tab is manufactured through a notching process, and the notching process comprises a winding roller, on which a band-shaped sheet is wound, a notching part, which notches an uncoated portion of the sheet supplied from the winding roller to manufacture an electrode tab, and a collecting roller, which collects the sheet in which the electrode tab is manufactured.

Here, when all the sheet wound on the winding roller has been supplied in the notching process, a new winding roller is mounted after removing the used winding roller, and then the notching process is performed again.

Here, the notching operation is performed after connecting an end portion of the sheet remaining in the used winding roller to an end portion of a sheet wound on the new winding roller.

However, when the sheet remaining in the used winding roller is connected to the sheet wound on the new winding roller, a notching defect occurs as a stepped region is generated.

BRIEF SUMMARY OF THE INVENTION An object of the present invention for solving the above problems is to provide an electrode connecting device, an electrode connecting method, and a secondary battery notching machine comprising same, by which an used sheet and a new sheet can be aligned and connected to each other in a longitudinal direction. Accordingly, it is possible to prevent the generation of a stepped region between the used sheet and the new sheet, and as a result, it is possible to prevent the occurrence of a notching defect during a notching process.

The present invention for solving the above problems provides an electrode connecting device for connecting an end of a preceding sheet to an end of a succeeding sheet, the electrode connecting device comprising: an arrangement member provided with an arrangement part on which the end of the preceding sheet is located adjacent to or overlapping with the end of the succeeding sheet; and a guide member comprising a guide bar which is provided movable between a support position to support a side portion of the preceding sheet and a side portion of the succeeding sheet during connecting of the end of the preceding sheet to the end of the succeeding sheet and a retreat position not to interfere with movements of the preceding sheet and the succeeding sheet.

The arrangement member further may comprise a pathline which is provided at the support position and indicates the support position at which the guide bar is positioned.

The electrode connecting device may further comprise a detection member which detects the side portion of the preceding sheet and the side portion of the succeeding sheet that are supported on the guide bar of the guide member, wherein the detection member comprises a first detection sensor, which is provided on one side of the guide bar and detects the side portion of the preceding sheet, and a second detection sensor, which is provided on the other side of the guide bar and detects the side portion of the succeeding sheet.

The arrangement part may comprise one side-arrangement surface, on which the end of the preceding sheet is disposed, and the other side-arrangement surface, on which the end of the succeeding sheet is disposed, wherein the electrode connecting device comprises a cutting member, and when the end of the preceding sheet disposed on the one side-arrangement surface is disposed overlapping with the end of the succeeding sheet disposed on the other side-arrangement surface, the cutting member cuts overlapping portions of the preceding sheet and the succeeding sheet and correspondingly matches the end of the preceding sheet with the end of the succeeding sheet.

A cutting groove, into which the cutting member is inserted, may be formed between the one side-arrangement surface and the other side-arrangement surface.

The electrode connecting device may further comprise an adhesive member which connects the end of the preceding sheet disposed on the one side-arrangement surface to the end of the succeeding sheet disposed on the other side-arrangement surface.

The adhesive member may comprise an adhesive tape which is attached to the end of the preceding sheet and the end of the succeeding sheet and connects and aligns the end of the preceding sheet to the end of the succeeding sheet.

The electrode connecting device may further comprise a suction member provided with a first suction, which adheres the preceding sheet to the one side-arrangement surface through a suction force, and a second suction, which adheres the succeeding sheet to the other side-arrangement surface through a suction force.

The pathline may have a rod shape and be separably coupled to a coupling groove formed in a surface of the arrangement member.

Also, the present invention provides an electrode connecting method for connecting an end of a preceding sheet to an end of a succeeding sheet, the electrode connecting method comprising: a process (a) of moving a guide member forward so that a guide bar of the guide member is moved from a retreat position of an arrangement member to a support position; a process (b) of correspondingly arranging the end of the preceding sheet and the end of the succeeding sheet on an arrangement part of the arrangement member, wherein the end of the preceding sheet and the end of the succeeding sheet are arranged adjacent to or overlapping with each other by supporting, on the guide bar, a side portion of the preceding sheet and a side portion of the succeeding sheet; and a process (c) of attaching an adhesive tape of an adhesive member to the end of the preceding sheet and the end of the succeeding sheet, which are arranged on the arrangement part of the arrangement member, so that the end of the preceding sheet is connected to the end of the succeeding sheet.

In the process (a), a pathline may be provided at the support position to indicate the support position at which the guide bar is positioned.

The process (b) may further comprise a detection process of detecting the side portion of the preceding sheet and the side portion of the succeeding sheet, which are supported on the guide bar, through a detection member that comprises a first detection sensor and a second detection sensor, wherein in the detection process, the side portion of the preceding sheet supported on the guide bar is detected by the first detection sensor, and the side portion of the succeeding sheet supported on the guide bar is detected by the second detection sensor.

The process (b) may further comprise a process of, when the end of the preceding sheet and the end of the succeeding sheet arranged in the arrangement part are not matched, overlapping the end of the preceding sheet and the end of the succeeding sheet so that the non-matched portions are present in overlapping portions, wherein the electrode connecting method further comprises, between the process (b) and the process (c), a process (b1) of cutting the overlapping portions of the end of the preceding sheet and the end of the succeeding sheet by a cutting member and correspondingly matching the end of the preceding sheet with the end of the succeeding sheet.

The process (b) may further comprise a process of adhering and fixing the end of the preceding sheet and the end of the succeeding sheet to the arrangement part by a suction member.

Also, a notching machine according to the present invention comprise the electrode connecting device.

Advantageous Effects

The electrode connecting device according to the present invention may align and connect the end of the preceding sheet to the end of the succeeding sheet. Accordingly, it is possible to prevent the generation of the stepped region between the end of the preceding sheet and the end of the succeeding sheet, and as a result, it is possible to prevent the occurrence of the defect during the sheet notching.

Figure 1:
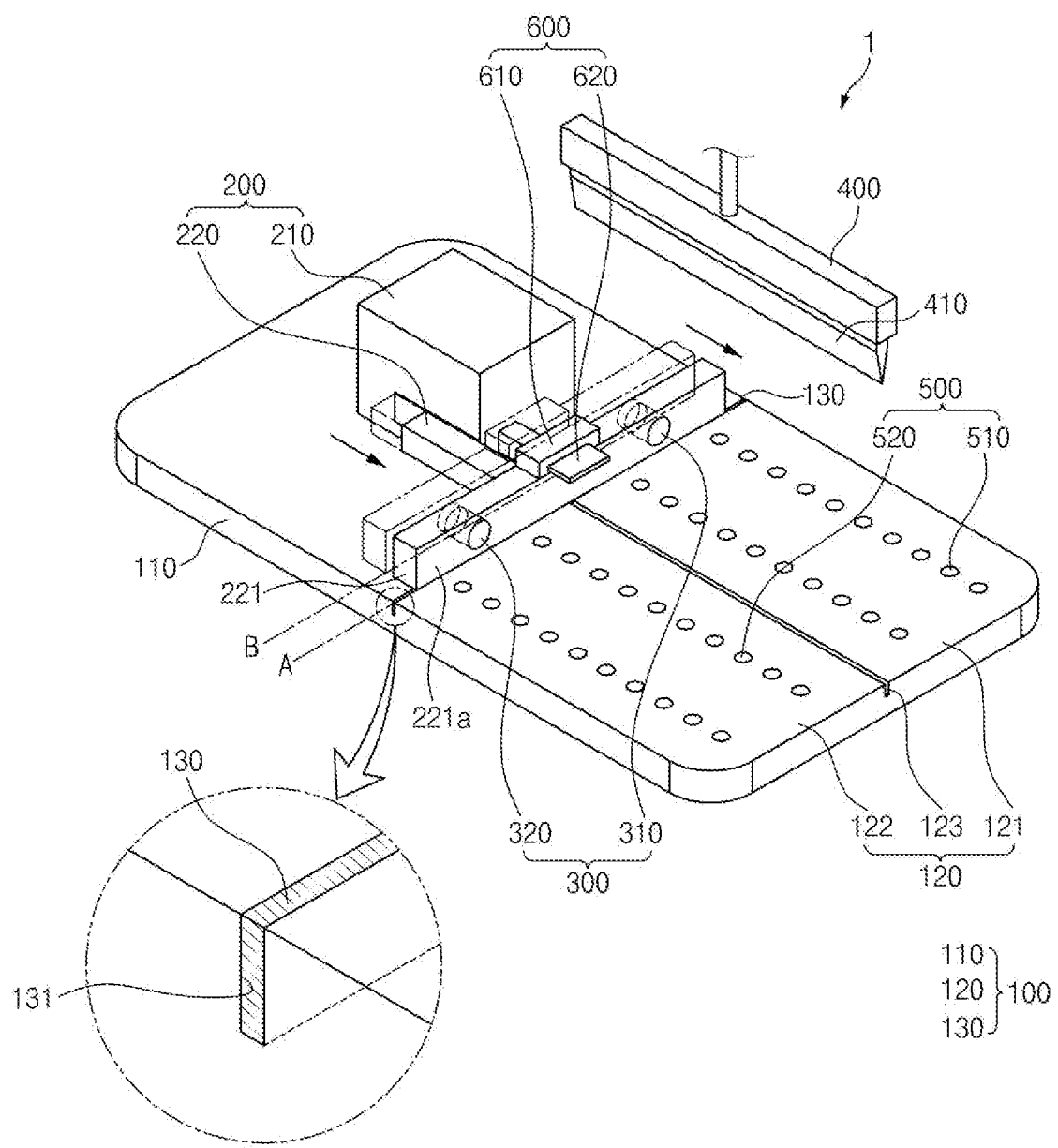
FIG. 1 is a perspective view illustrating an electrode connecting device according to a first embodiment of the present invention.
Figure 2:
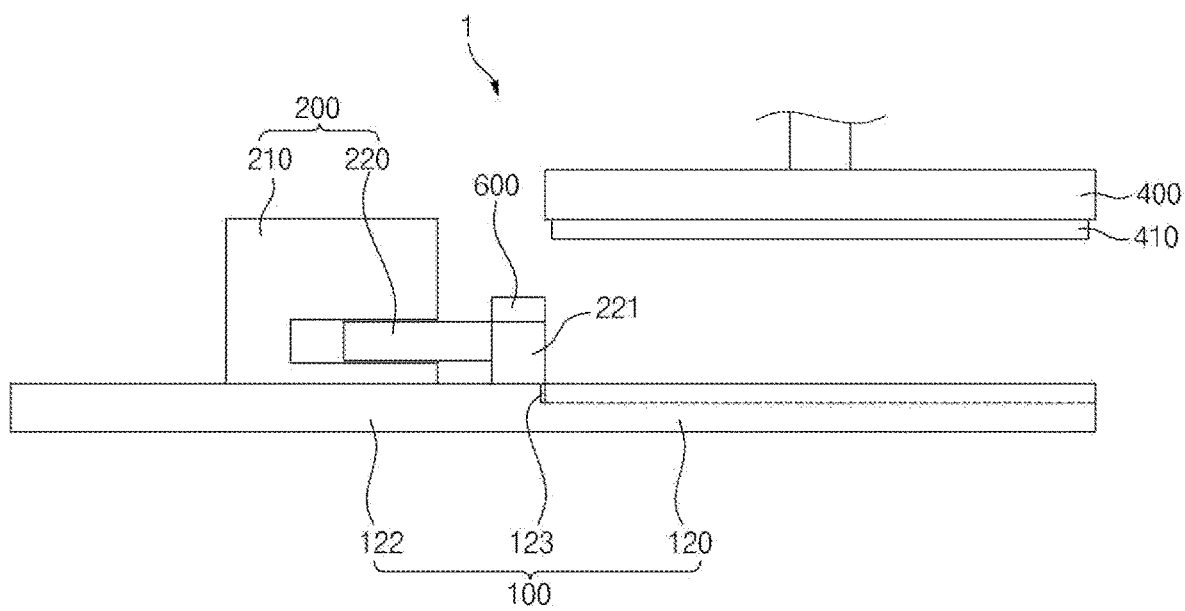
FIG. 2 is a side view of FIG. 1.
Figure 3:
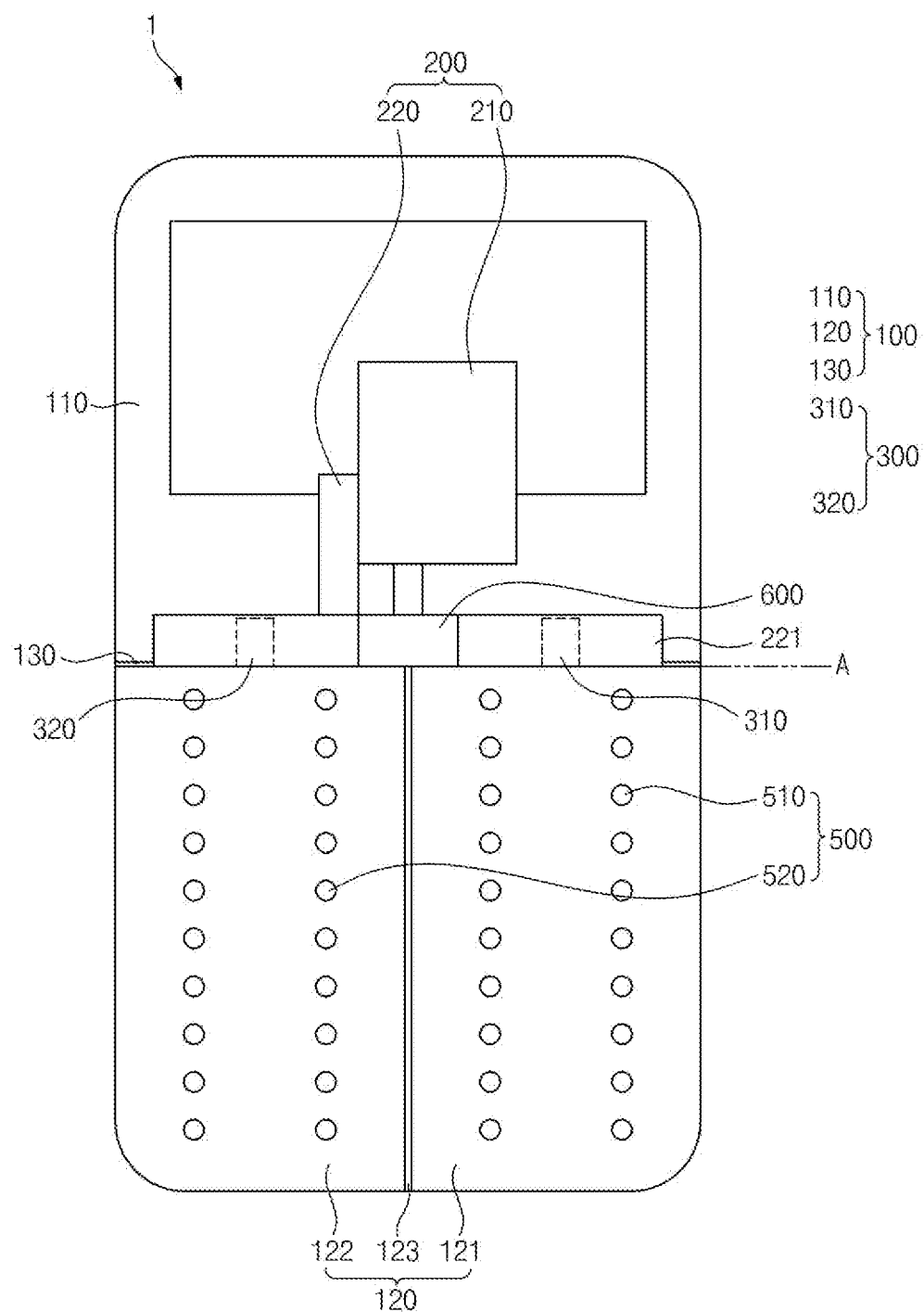
FIG. 3 is a plan view of FIG. 1.

DETAILED DESCRIPTION Hereinafter, embodiments of the present invention will be described in detail with reference to the accompanying drawings so as to be easily carried out by a person skilled in the art to which the present invention pertains. However, the present invention may be embodied in various different forms, and is not limited to the embodiments described herein. Also, in the drawings, parts irrelevant to the description will be omitted to clearly describe the present invention, and similar elements will be designated by similar reference numerals throughout the specification.

Electrode Connecting Device According to a First Embodiment of the Present Invention An electrode connecting device 1 according to a first embodiment of the present invention is to align and connect an end of a sheet that precedes (hereinafter, referred to as a preceding sheet) to an end of a sheet that succeeds (hereinafter, referred to as a succeeding sheet) in a longitudinal direction, thereby preventing the generation of a stepped region between the preceding sheet and the succeeding sheet.

Figure 4:
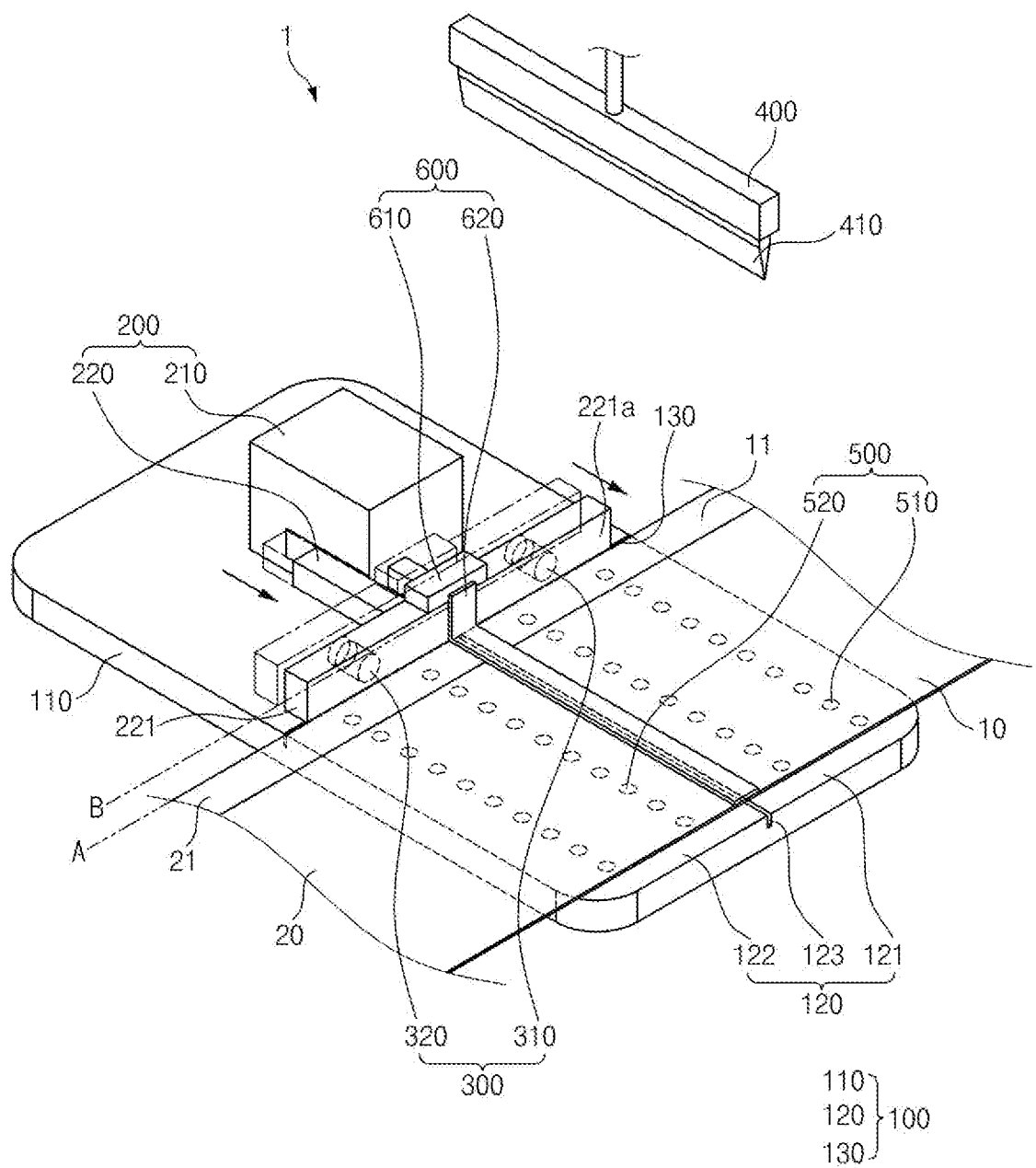
FIG. 4 is a perspective view showing an arrangement state of the electrode connecting device according to the first embodiment of the present invention.

That is, referring to FIGS. 1 and 4, the electrode connecting device 1 according to the first embodiment of the present invention comprises: an arrangement member 100 provided with an arrangement part 120 on which the end of the preceding sheet 10 is located adjacent to or overlapping with the end of the succeeding sheet 20; and a guide member 220 comprising a guide bar 221 which is provided movable between a support position (a position 'A' indicated in FIG. 1) to support a side portion of the preceding sheet 10 and a side portion of the succeeding sheet 20 during connecting of the end of the preceding sheet 10 to the end of the succeeding sheet 20 and a retreat position (a position 'B' indicated in FIG. 1) not to interfere with movements of the preceding sheet 10 and the succeeding sheet 20. Accordingly, the end of the preceding sheet and the end of the succeeding sheet may be arranged correspondingly, and as a result, the end of the preceding sheet may be aligned and connected to the end of the succeeding sheet.

Hereinafter, the electrode connecting device 1 according to the first embodiment of the present invention will be described in detail with reference to the accompanying drawings.

As illustrated in FIGS. 1 to 6, the electrode connecting device 1 according to the first embodiment of the present invention comprises an arrangement member 100, an alignment means 200 provided with a driving member 210 and a guide member 220, a detection member 300, a cutting member 400, a suction member 500, and an adhesive member 600.

Also, the preceding sheet 10 has a long sheet shape, and an uncoated portion 11 with no electrode active material is formed on one side thereof in the width direction. Also, the succeeding sheet 20 has a long sheet shape, and an uncoated portion 21 with no electrode active material is formed on one side thereof in the width direction.

Here, the preceding sheet 10 and the succeeding sheet 20 has the same polarity. That is, the preceding sheet 10 and the succeeding sheet 20 may be a positive electrode sheet or a negative electrode sheet.

Arrangement Member

The arrangement member 100 comprises: a fixed part 110 provided on one side (the left side of the arrangement member when viewed in FIG. 1); an arrangement part 120 which is provided on the other side (the right side of the arrangement member when viewed in FIG. 1) and on which the end of the preceding sheet 10 and the end of the succeeding sheet 20 are arranged so as to correspond to each other; and a pathline 130 provided at a support position A indicated between the fixed part 110 and the arrangement part 120.

The fixed part 110 serves to support the guide member 220 comprising the guide bar 221 that moves to a retreat position B. That is, the fixed part 110 has a flat surface so that the guide member horizontally moves forward or backward thereon.

The arrangement part 120 serves to correspondingly arrange the end of the preceding sheet 10 and the end of the succeeding sheet 20. That is, the arrangement part 120 comprises: one side-arrangement surface 121 which is provided in one surface on the other side (the upper surface on the right side of the arrangement member when viewed in FIG. 1) and on which the end of the preceding sheet 10 is located; and the other side-arrangement surface 122 which is provided in the other surface on the other side (the lower surface on the right side of the arrangement member when viewed in FIG. 1) and on which the end of the succeeding sheet 20 is located.

Here, the end of the preceding sheet 10 and the end of the succeeding sheet 20 are arranged to correspond to the one side-arrangement surface 121 and the other side-arrangement surface 122, respectively.

The pathline 130 is intended to indicate the support position A. That is, the pathline 130 serves as a reference point for matching the end of the preceding sheet 10 and the end of the succeeding sheet 20 which are arranged in the arrangement part 120. This pathline 130 is elongated in a conveyance direction of the preceding sheet (the left-right direction when viewed in FIG. 3) and may be indicated as a straight line or dotted line on the surface of the arrangement member 100 between the fixed part 110 and the arrangement part 120. Here, the pathline 130 may be indicated by a color such as red or yellow so as to increase indication capability.

Particularly, referring to an enlarged view of FIG. 1, the pathline 130 may be provided detachably from the surface of the arrangement member 100. That is, the pathline 130 may have a rod shape and be separably coupled to a coupling groove 131 formed in the surface of the arrangement member 100. Also, the thickness of the pathline 130 in the full width direction (the width direction of the sheet perpendicular to the conveyance direction of the sheet) is 0.3 mm to 2 mm, preferably 0.5 mm to 0.1 mm, and may be made of a nonmetal material to increase strength.

Alignment Means

The alignment means 200 serves to match and align the end of the preceding sheet and the end of the succeeding sheet, which are arranged on the arrangement part, with each other. That is, the alignment means 200 comprises: a driving member 210 fixed to the fixed part 110; and a guide member 220 provided with a guide bar 221 which is moved forward to the pathline 130 by the driving member 210 and supports the end of the preceding sheet and the end of succeeding sheet so that both the ends are positioned at the support position A at which the pathline is positioned.

The driving member 210 comprises a cylinder, and the cylinder moves the guide member 220 forward toward the pathline 130 so that the guide bar 221 is positioned to the support position A at which the pathline 130 is provided, or moves the guide member 220 backward to the retreat position B so as to prevent the occurrence of interference when the preceding sheet and the succeeding sheet move. Here, the driving member 210 moves the guide member 220 forward so that a supporting surface 221a of the guide bar 221, on which the end of the preceding sheet 10 and the end of the succeeding sheet 20 are supported, is positioned to match the pathline 130.

Also, the arrangement member 100 may comprise a position detection sensor which detects the supporting surface 221a of the guide bar 221, which is positioned at the pathline 130, and stops the driving member 210. That is, the position detection sensor may accurately position the supporting surface 221a of the guide bar 221 to the pathline 130.

The guide member 220 serves to support the end of the preceding sheet and the end of the succeeding sheet so that both the ends are positioned to the pathline 130. That is, the guide member 220 comprises the guide bar 221 which is moved forward to the pathline 130 by the driving member 210 and supports a side portion of the preceding sheet 10 (the left side portion of the preceding sheet in the width direction when viewed in FIG. 1) and a side portion of the succeeding sheet 20 (the left side portion of the succeeding sheet in the width direction when viewed in FIG. 1). Accordingly, the guide bar 221 simultaneously supports the side portion of the preceding sheet 10 and the side portion of the succeeding sheet 20, and as a result, the preceding sheet 10 may be positioned to match the succeeding sheet 20.

Detection Member

The detection member 300 serves to detect whether the end of the preceding sheet and the end of the succeeding sheet are supported on the guide bar. That is, the detection member 300 comprises a first detection sensor 310, which is provided on one side of the supporting surface 221a of the guide bar 221 and detects the side portion of the preceding sheet 10, and a second detection sensor 320, which is provided on the other side of the supporting surface 221a of the guide bar 221 and detects the side portion of the succeeding sheet 20.

Through the detection member 300 having the above configuration, it may be known that both the side portion of the preceding sheet 10 and the side portion of the succeeding sheet 20 are supported on the guide bar 221, when detection signals are generated in the first detection sensor 310 and the second detection sensor 320. Also, when the detection signal is generated in only one of the first detection sensor 310 and the second detection sensor 320, it may be known that only one of the side portion of the preceding sheet 10 and the side portion of the succeeding sheet 20 is supported on the guide bar 221. In addition, when the detection signal is not generated in both the first detection sensor 310 and the second detection sensor 320, it may be known that both the side portion of the preceding sheet 10 and the side portion of the succeeding sheet 20 are not supported on the guide bar 221.

Thus, according to the detection signals, it may be conveniently confirmed by the detection member 300 whether the side portion of the preceding sheet 10 and the side portion of the succeeding sheet 20 are supported on the guide bar 221, that is, whether the side portion of the preceding sheet 10 and the side portion of the succeeding sheet 20 are positioned at the support position A. Also, the detection member may be provided as a pressure sensor.

Figure 5:
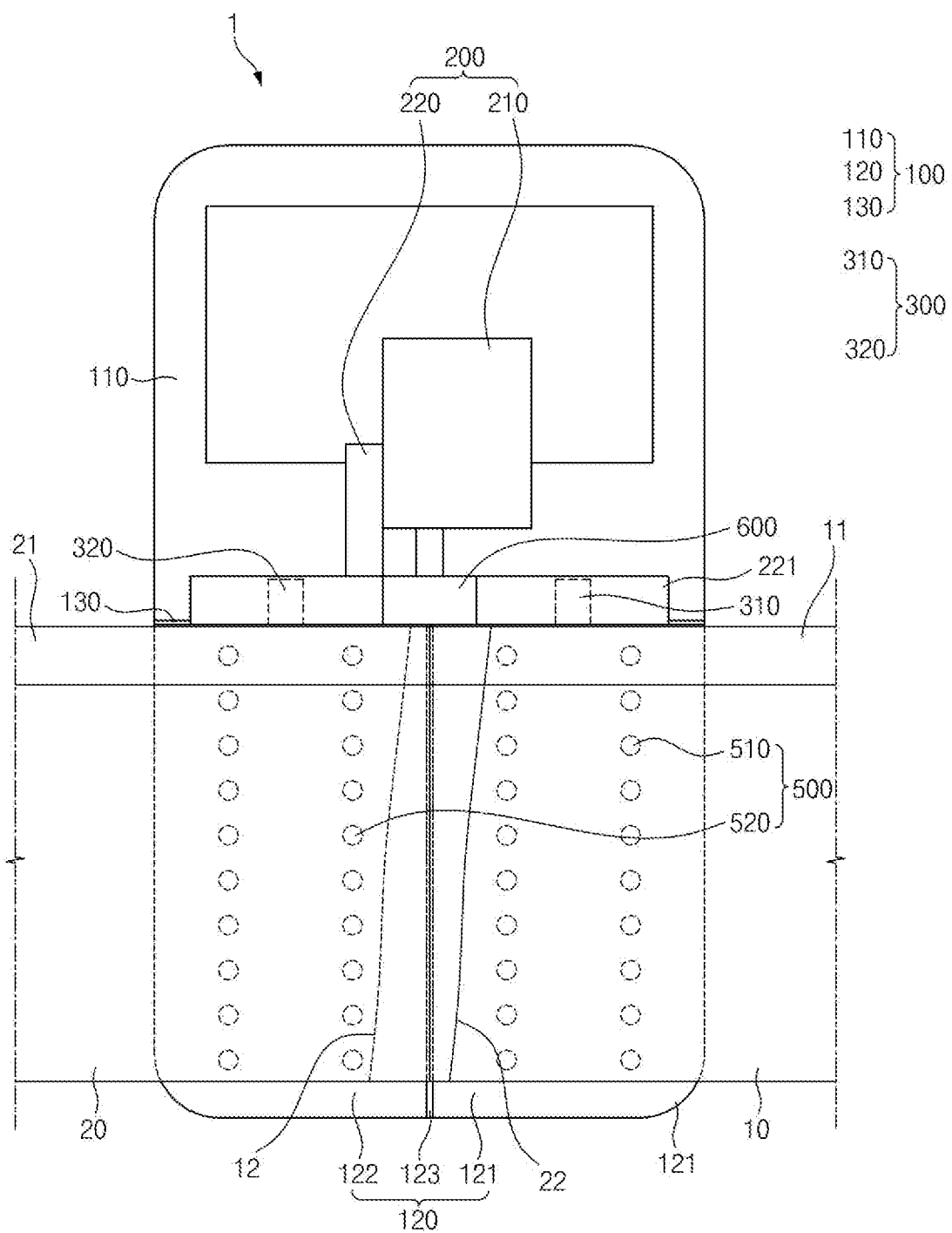
FIG. 5 is a plan view showing a cutting state of the electrode connecting device according to the first embodiment of the present invention.
Figure 6:
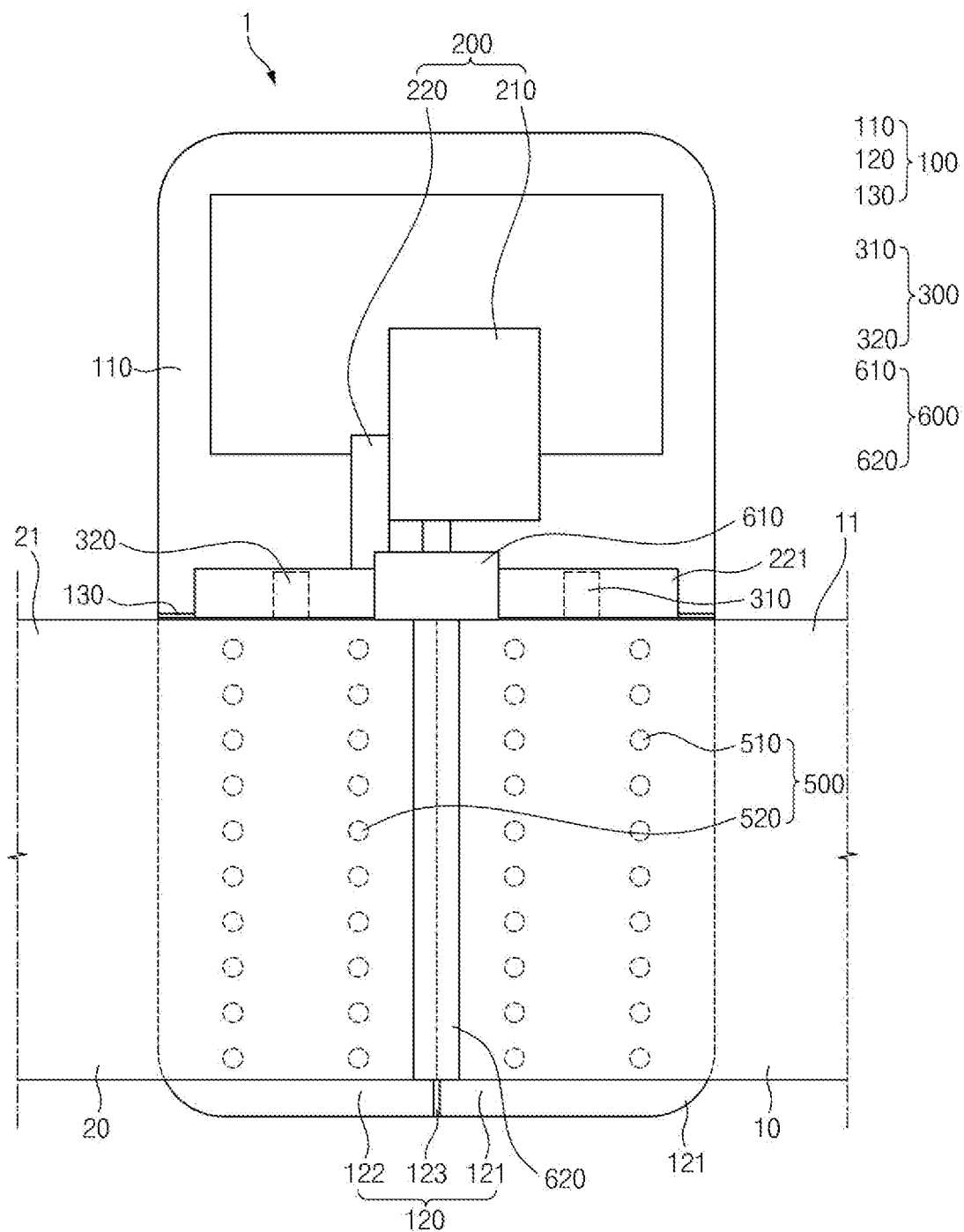
FIG. 6 is a plan view showing a bonding state of the electrode connecting device according to the first embodiment of the present invention.
Figure 7:
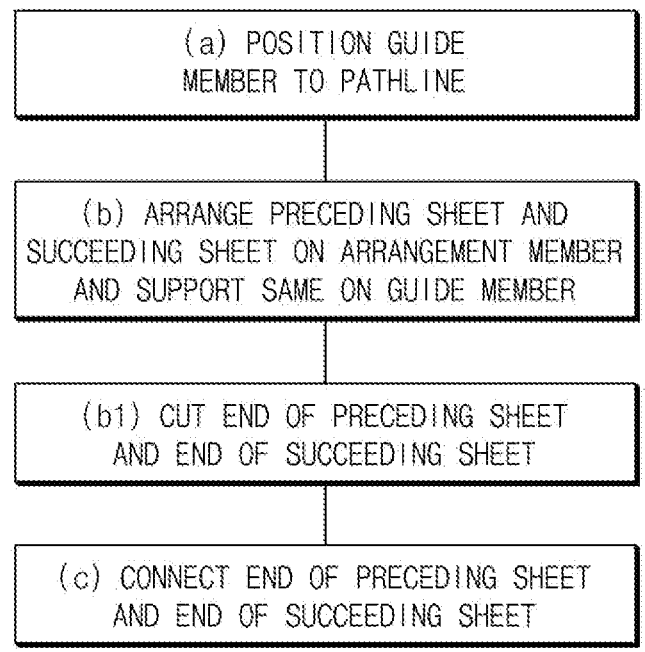
FIG. 7 is a flowchart showing an electrode connecting method according to the first embodiment of the present invention.
Figure 8:
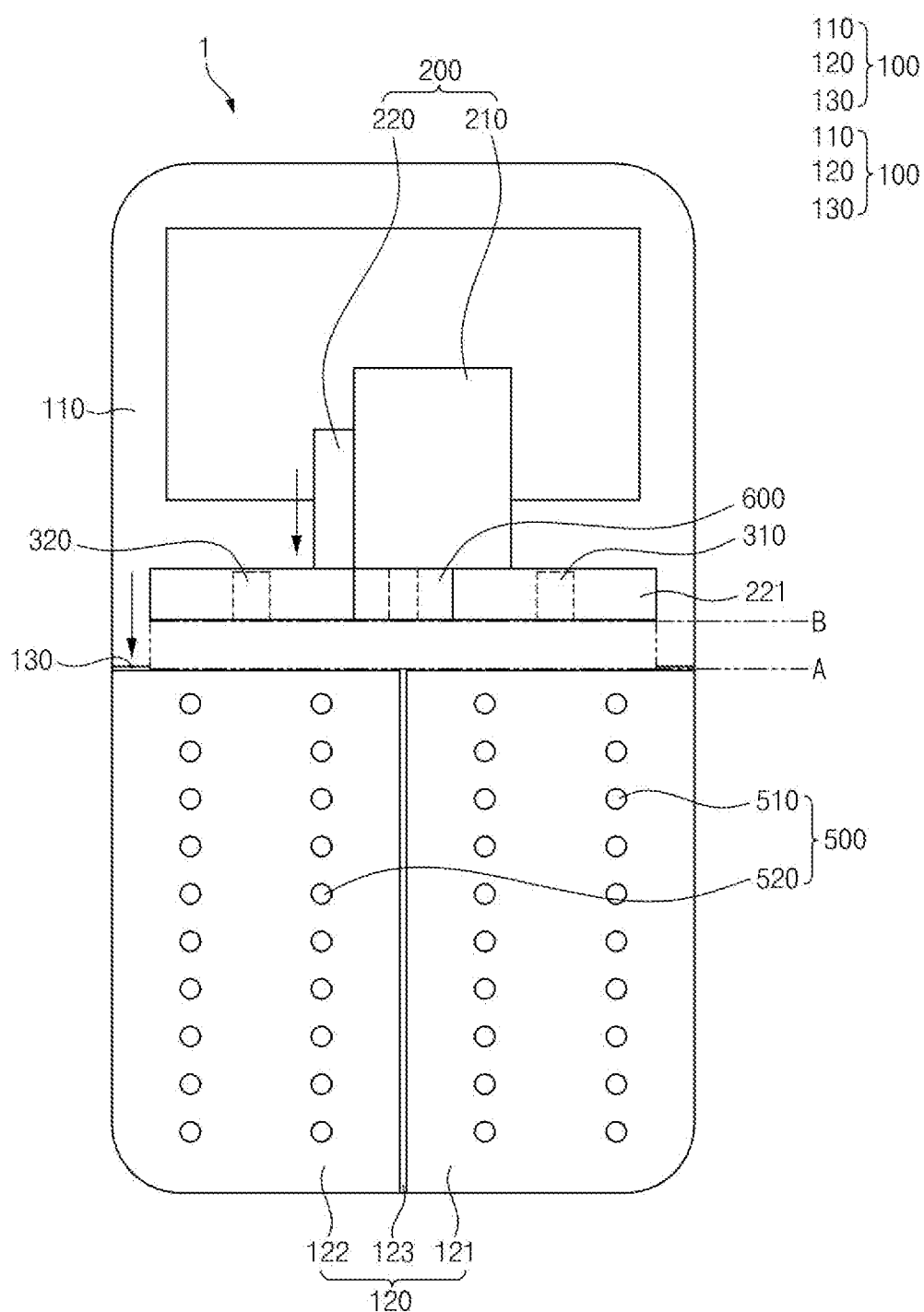
FIG. 8 is a plan view showing a process (a) of the electrode connecting method according to the first embodiment of the present invention.
Figure 9:
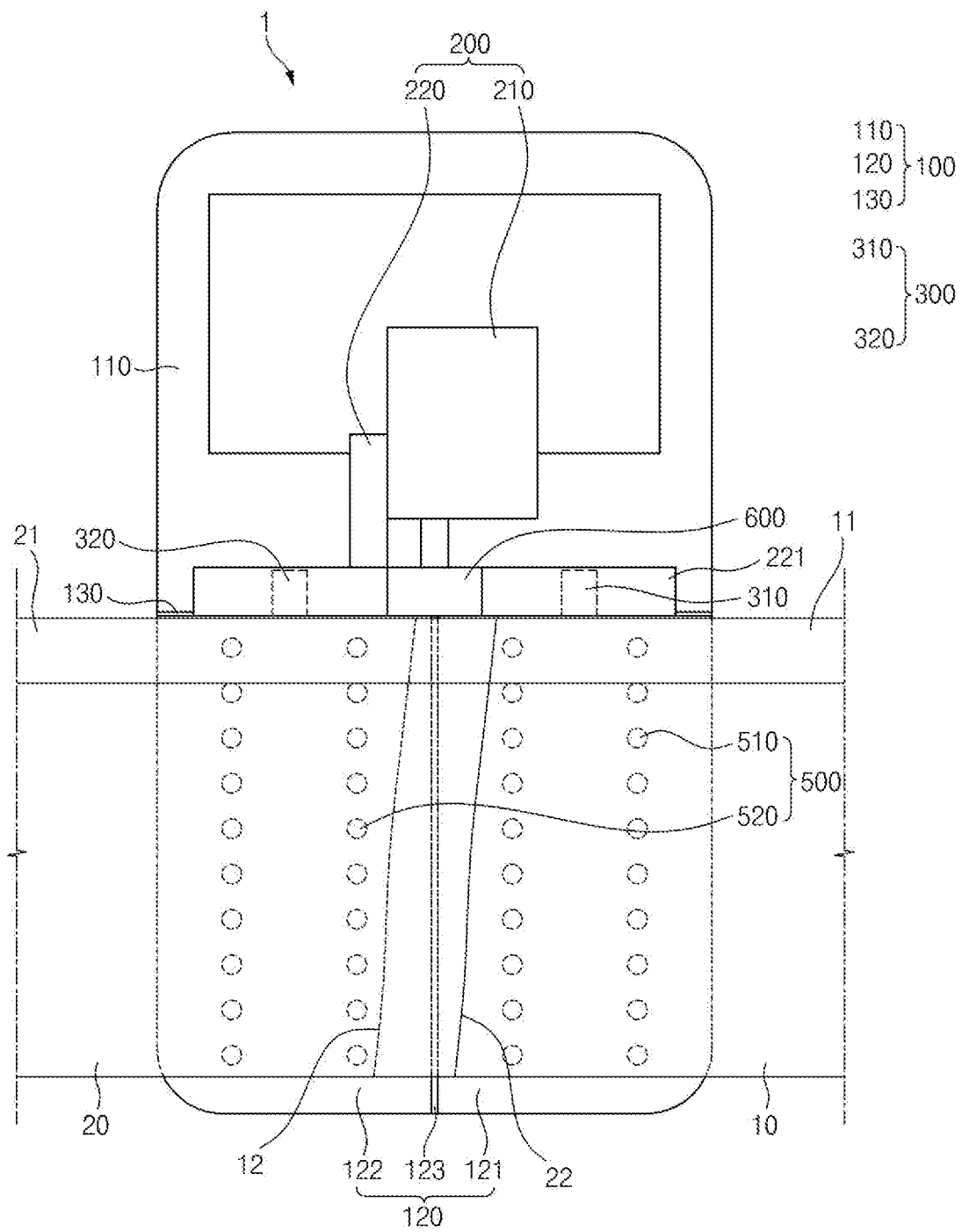
FIG. 9 is a plan view showing a process (b) of the electrode connecting method according to the first embodiment of the present invention.
Figure 10:
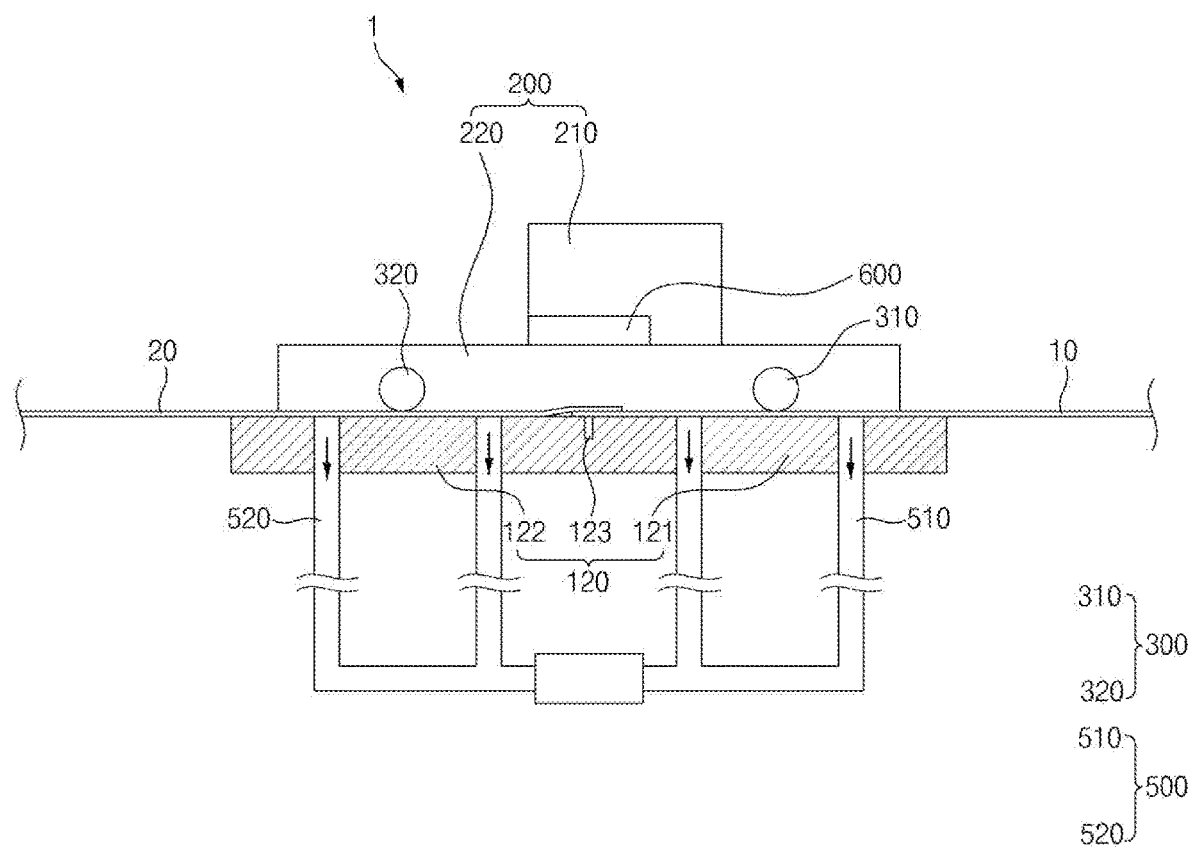
FIG. 10 is a cross-sectional view showing a suction process in the process (b) of the electrode connecting method according to the first embodiment of the present invention.
Figure 11:
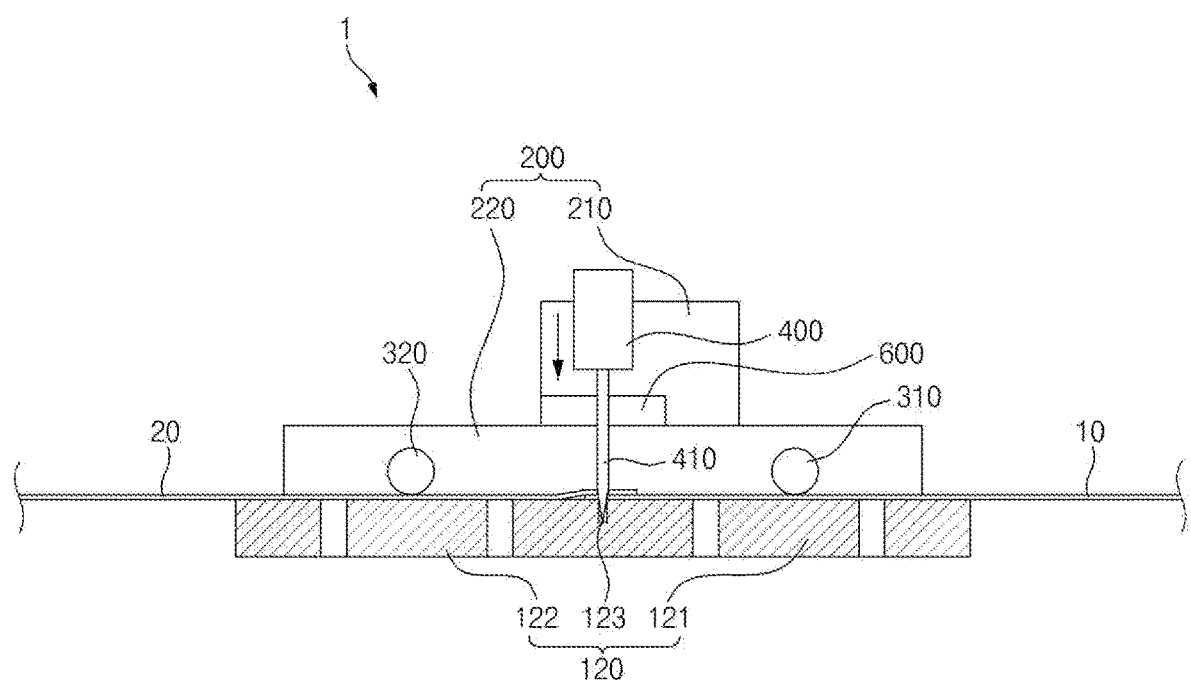
FIG. 11 is a front view showing a process (b1) of the electrode connecting method according to the first embodiment of the present invention.
Figure 12:
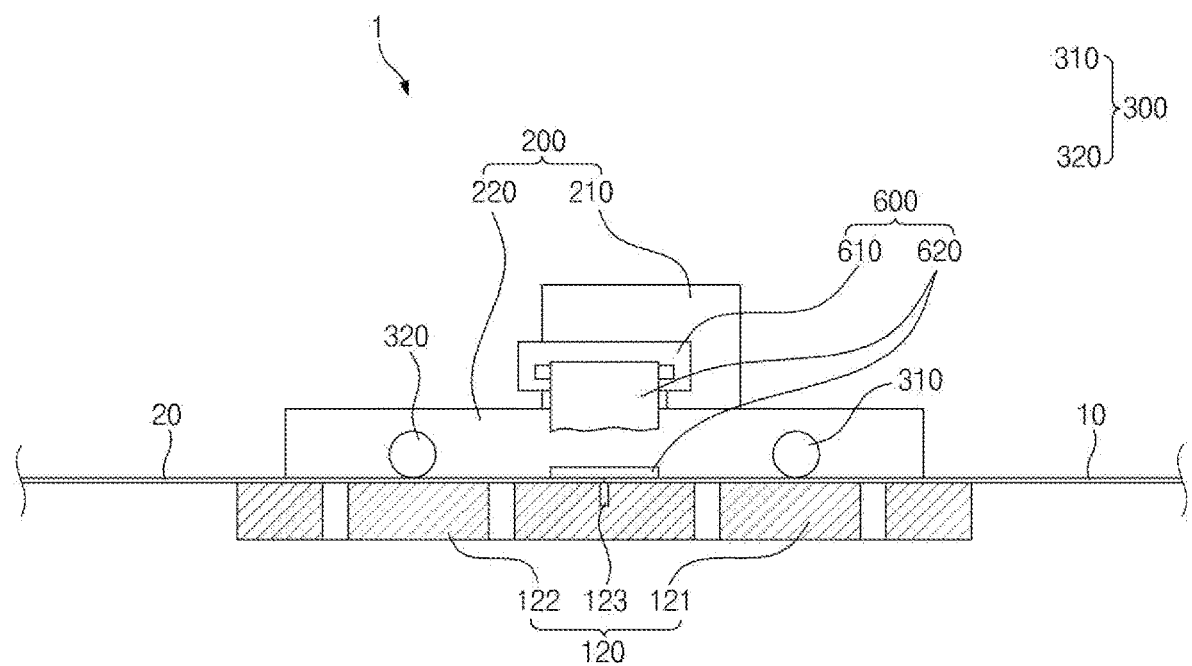
FIG. 12 is a front view showing a process (c) of the electrode connecting method according to the first embodiment of the present invention.

Also, as illustrated in FIG. 5, when an end surface 12 of the preceding sheet 10 and an end surface 22 of the succeeding sheet 20 arranged in the arrangement part are not matched, the end surface 12 of the preceding sheet 10 and the end surface 22 of the succeeding sheet 20, which are not matched, are arranged overlapping with each other and then cut through the cutting member 400, and thus the end of the preceding sheet 10 may be correspondingly matched with the end of the succeeding sheet 20.

Cutting Member

The cutting member 400 serves to cut the end of the preceding sheet and the end of the succeeding sheet, which correspond to each other, so that the ends are matched with each other. That is, the cutting member 400 may ascend or descend toward the arrangement member 100, and comprises a cutting blade 410 that cuts the overlapping portions of the end of the preceding sheet and the end of the succeeding sheet when descending. Accordingly, it is possible to prevent the generation of a stepped region between the end of the preceding sheet and the end of the succeeding sheet, and the end of the preceding sheet may be correspondingly matched with the end of the succeeding sheet.

Also, a cutting groove 123, into which the cutting blade 410 of the cutting member 400 is inserted, is formed between the one side-arrangement surface 121 and the other side-arrangement surface 122. Accordingly, the cutting blade 410 of the cutting member 400 is inserted into the cutting groove after passing through the overlapping portions of the end of the preceding sheet and the end of the succeeding sheet, and thus the end of the preceding sheet and the end of the succeeding sheet may be accurately cut.

Suction Member

The suction member 500 serves to adhere and fix the preceding sheet and the succeeding sheet arranged on the arrangement part or suction and remove foreign substances remaining on the preceding sheet and the succeeding sheet. That is, the suction member 500 comprises a first suction element 510, which adheres the preceding sheet 10 disposed on the one side-arrangement surface to the one side-arrangement surface 121 through a suction force, and a second suction element 520, which adheres the succeeding sheet 20 disposed on the other side-arrangement surface to the other side-arrangement surface 122 through a suction force.

Here, the first suction element 510 suctions air through a plurality of suction holes formed in the one side-arrangement surface and adheres the preceding sheet 10 to the one side-arrangement surface 121, and the second suction element 520 suctions air through a plurality of suction holes formed in the other side-arrangement surface 122 and adheres the succeeding sheet 20 to the other side-arrangement surface 122.

Thus, the suction member 500 may remove the foreign substances remaining on the preceding sheet and the succeeding sheet and fix the sheets immovably with respect to the arrangement part.

Adhesive Member

The adhesive member 600 serves to align and inseparably connect the end of the preceding sheet disposed on the one side-arrangement surface to the end of the succeeding sheet disposed on the other side-arrangement surface. That is, the adhesive member 600 comprises an adhesive body 610, which is provided in the guide bar 221 positioned on the same horizontal line as the cutting groove, and an adhesive tape 620, which is provided in the adhesive body 610 and is attached to and covers the end of the preceding sheet 10 and the end of the succeeding sheet 20 and which aligns and inseparably connects the end of the preceding sheet 10 to the end of the succeeding sheet 20.

Thus, the electrode connecting device 1 according to the first embodiment of the present invention may align the connect the end of the preceding sheet to the end of the succeeding sheet without the generation of stepped regions, and as a result, it is possible to prevent the occurrence of a defect during a notching process.

Hereinafter, an electrode connecting method according to the first embodiment of the present invention will be described.

Electrode Connecting Method According to the First Embodiment of the Present Invention As illustrated in FIGS. 7 to 12, the electrode connecting method according to the first embodiment of the present invention is a method for connecting an end of a preceding sheet to an end of a succeeding sheet, the electrode connecting method comprising: a process (a) of moving a guide bar 221 of a guide member 220 to a support position A at which a pathline 130 of an arrangement member 100 is provided; a process (b) of arranging the end of the preceding sheet and the end of the succeeding sheet so that both the ends are matched with an arrangement part 120 of the arrangement member 100; and a process (c) of connecting the end of the preceding sheet 10 to the end of the succeeding sheet 20 by using an arrangement member 600. Here, when the end of the preceding sheet 10 is not matched with the end of the succeeding sheet 20, the method further comprises a process (b1) of positioning the end of the preceding sheet 10 and the end of the succeeding sheet 20 so that both the ends overlap with each other, and then cutting both the ends by using a cutting member 400 so that both the ends are matched with each other.

In the process (a), the guide member 220 is moved forward by using a driving member 210 provided in fixed part 110 of the arrangement member 100, and the guide bar 221 of the guide member 220 is positioned to the pathline 130 of the arrangement member 100. Here, a supporting surface 221a of the guide bar 221 is positioned to match the pathline 130.

In the process (b), the end of the preceding sheet 10 and the end of the succeeding sheet 20 are arranged so as to correspond to each other on the arrangement part 120 of the arrangement member 100. Here, a side portion of the preceding sheet 10 and a side portion of the succeeding sheet 20 are supported on the supporting surface 221a of the guide bar 221. Thus, the end of the preceding sheet 10 and the end of the succeeding sheet 20 are arranged to correspond to each other.

For one example, the end of the preceding sheet 10 is located on one side-arrangement surface 121 of the arrangement part 120, and the end of the succeeding sheet 20 is located on the other side-arrangement surface 122 of the arrangement part 120.

Also, the process (b) may further comprise a detection process of detecting the side portion of the preceding sheet 10 and the side portion of the succeeding sheet 20, which are supported on the guide bar 221, through a detection member 300. That is, in the detection process, the side portion of the preceding sheet 10 supported on the guide bar 221 is detected by a first detection sensor 310 of the detection member 300, and the side portion of the succeeding sheet 20 supported on the guide bar 221 is detected by a second detection sensor 320 of the detection member 300. Thus, it may be conveniently confirmed whether the side portion of the preceding sheet 10 and the side portion of the succeeding sheet 20 are supported on the guide bar 221.

Also, the process (b) may further comprise an adhering process of adhering and fixing the end of the preceding sheet 10 and the end of the succeeding sheet 20, which are arranged on the arrangement part 120, to the arrangement part 120 through a suction member 500 or removing foreign substances that remain on the preceding sheet 10 and the succeeding sheet 20. That is, in the adhering process, the preceding sheet 10 is adhered to the one side-arrangement surface 121 through a suction force generated by a first suction 510 of the suction member 500, and the succeeding sheet 20 is adhered to the other side-arrangement surface 122 through a suction force generated by a second suction 520 of the suction member 500.

Also, when an end surface 12 of the preceding sheet 10 and an end surface 22 of the succeeding sheet 20 arranged in the arrangement part 120 are not matched, the process (b) may further comprise a process of arranging the end surface 12 of the preceding sheet 10 and the end surface 22 of the succeeding sheet 20 so that the non-matched portions thereof overlap with each other.

Also, the method further comprises a process (b1) of cutting the overlapping portions of the end of the preceding sheet 10 and the end of the succeeding sheet 20 and matching the end of the preceding sheet 10 with the end of the succeeding sheet 20.

The process (b1) is performed between the process (b) and the process (c). That is, in the process (b1), the center of the overlapping portions of the end of the preceding sheet 10 and the end of the succeeding sheet 20 is cut through the cutting member 400, and thus the end of the preceding sheet 10 and the end of the succeeding sheet 20 are matched to correspond to each other.

In the process (c), the end of the preceding sheet 10 and the end of the succeeding sheet 20, which are arranged on the arrangement part 120 of the arrangement member 100, are connected to each other, while being aligned, through the adhesive member 600. That is, in the process (c), the end of the preceding sheet 10 is attached to the end of the succeeding sheet 20 by using an adhesive tape 620 of the adhesive member 600 provided in the guide member 220.

Also, when the process (c) is completed, the first detection sensor 310 and the second detection sensor 320 detect again the side portion of the preceding sheet 10 and the side portion of the succeeding sheet 20, respectively. Here, when both the side portion of the preceding sheet 10 and the side portion of the succeeding sheet 20 are detected, the guide bar is moved backward to the retreat, and then an operation for conveying a sheet is resumed. Here, when at least one of the side portion of the preceding sheet 10 or the side portion of the succeeding sheet 20 is not detected, a failure signal is generated, and an operator connects again the end of the preceding sheet 10 to the end of the succeeding sheet 20 as in the manufacturing method described above.

Hereinafter, in describing another embodiment of the present invention, components having the same functions as those in the foregoing embodiment are given the same reference numerals, and their duplicated description will be omitted.

Secondary Battery Notching Machine According to a Second Embodiment of the Present Invention The secondary battery notching machine according to the second embodiment of the present invention may comprise the electrode connecting device 1 according to the first embodiment described above, and accordingly, a plurality of sheets continuously input to the notching machine may be connected without the generation of stepped regions.

Figure 13:
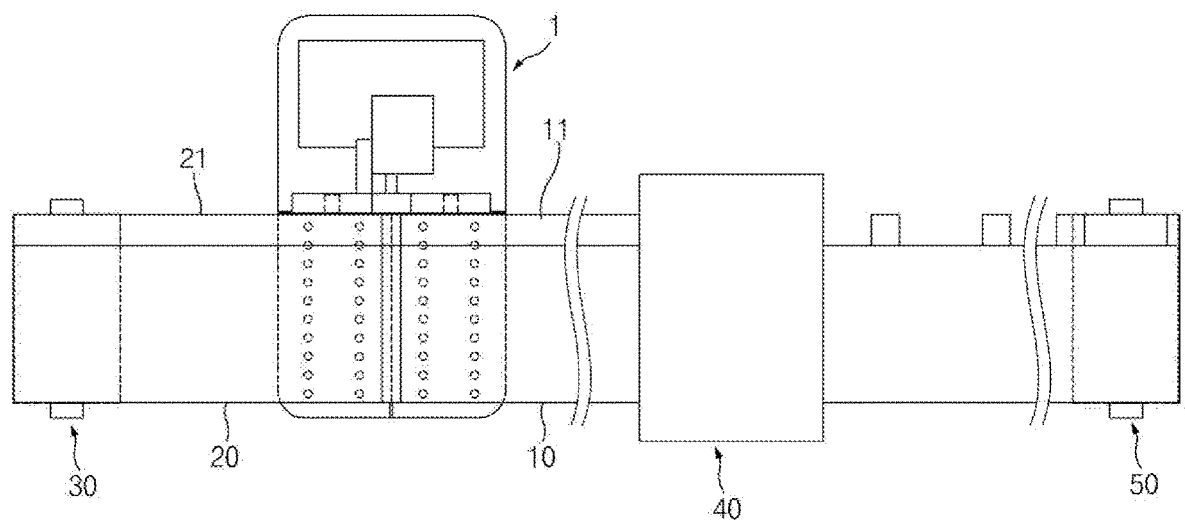
FIG. 13 is a plan view schematically illustrating a notching machine according to a second embodiment of the present invention.

That is, as illustrated in FIG. 13, the secondary battery notching machine according to the second embodiment of the present invention comprises: a supply roller 30 that supplies a wound sheet; a notching device 40 that notches an uncoated portion 11 of a sheet 10 supplied by the supply roller 30 and forms an electrode tab 11a; and a collecting roller 50 that collects the sheet 10 on which the electrode tab 11a is formed.

When all the sheet 10 wound on the supply roller 30 has been supplied, a sheet is supplied through a new supply roller 30. Here, the previous sheet supplied to the notching device (hereinafter, referred to as a preceding sheet 10) is connected to a new sheet (hereinafter, referred to as a succeeding sheet 20), and an electrode connecting device 1 is used herein.

That is, the electrode connecting device 1 comprises an arrangement member 100, an alignment means 200 provided with a driving member 210 and a guide member 220, a detection member 300, a cutting member 400, a suction member 500, and an adhesive member 600.

Here, the electrode connecting device 1 has the same configuration and function as the electrode connecting device according to the first embodiment, and accordingly, duplicated descriptions thereof will be omitted.

Thus, the secondary battery notching machine according to the second embodiment of the present invention comprises the electrode connecting device and thus may continuously supply a plurality of sheets without stepped regions.

The scope of the present invention is defined by the appended claims rather than the detailed description, and various embodiments derived from the meaning and scope of the claims and their equivalent concepts are also possible.

DESCRIPTION OF THE SYMBOLS

100: Arrangement member
110: Fixed part
120: Arrangement part
121: One side-arrangement surface
122: The other side-arrangement surface
123: Cutting groove
200: Alignment means
210: Driving member
220: Guide member
221: Guide bar
300: Detection member
310: First detection sensor

320: Second detection sensor
400: Cutting member
500: Suction member
510: First suction element
520: Second suction element
600: Adhesive member
610: Adhesive body
620: Adhesive tape

The invention claimed is:

1. An electrode connecting device for connecting an end of a preceding sheet to an end of a succeeding sheet, the electrode connecting device comprising:
    an arrangement member including an arrangement part on which the end of the preceding sheet is configured to be located adjacent to or overlapping with the end of the succeeding sheet; and
    a guide member comprising a guide bar configured to move between a support position to support a side portion of the preceding sheet and a side portion of the succeeding sheet during connecting of the end of the preceding sheet to the end of the succeeding sheet and a retreat position so as to not interfere with movements of the preceding sheet and the succeeding sheet.

2. The electrode connecting device of claim 1, wherein the arrangement member further comprises a pathline at the support position and configured to indicate the support position at which the guide bar is positioned.

3. The electrode connecting device of claim 2, further comprising a detection member configured to detect the side portion of the preceding sheet and the side portion of the succeeding sheet supported on the guide bar of the guide member,
    wherein the detection member comprises a first detection sensor, on one side of the guide bar and configure to detect the side portion of the preceding sheet, and a second detection sensor, on other side of the guide bar and configured to detect the side portion of the succeeding sheet.

4. The electrode connecting device of claim 1, wherein the arrangement part comprises a first side-arrangement surface, the end of the preceding sheet configured to be disposed on the first side-arrangement surface, and a second side-arrangement surface, the end of the succeeding sheet configured to be disposed on the second side-arrangement surface,
    wherein the electrode connecting device comprises a cutting member, and when the end of the preceding sheet disposed on the first side-arrangement surface is disposed overlapping with the end of the succeeding sheet disposed on the second side-arrangement surface, the cutting member is configured to cut overlapping portions of the preceding sheet and the succeeding sheet and to correspondingly match the end of the preceding sheet with the end of the succeeding sheet.

5. The electrode connecting device of claim 4, further comprising a cutting groove, into which the cutting member is configured to be inserted, formed between the first side-arrangement surface and the second side-arrangement surface.

6. The electrode connecting device of claim 5, further comprising an adhesive member connecting the end of the preceding sheet disposed on the first side-arrangement surface to the end of the succeeding sheet disposed on the second side-arrangement surface.

7. The electrode connecting device of claim 6, wherein the adhesive member comprises an adhesive tape attached to the end of the preceding sheet and the end of the succeeding sheet and configured to connect and align the end of the preceding sheet to the end of the succeeding sheet.

8. The electrode connecting device of claim 4, further comprising a suction member including a first suction element, configured to adhere the preceding sheet to the first side-arrangement surface through a suction force, and a second suction element, configured to adhere the succeeding sheet to the second side-arrangement surface through a suction force.

9. The electrode connecting device of claim 2, wherein the pathline has a rod shape and is separably coupled to a coupling groove formed in a surface of the arrangement member.

10. A notching machine comprising the electrode connecting device of claim 1.

11. An electrode connecting method for connecting an end of a preceding sheet to an end of a succeeding sheet, the electrode connecting method comprising:
    moving a guide member forward so that a guide bar of the guide member is moved from a retreat position of an arrangement member to a support position;
    correspondingly arranging the end of the preceding sheet and the end of the succeeding sheet on an arrangement part of the arrangement member, wherein the end of the preceding sheet and the end of the succeeding sheet are arranged adjacent to or overlapping with each other by supporting, on the guide bar, a side portion of the preceding sheet and a side portion of the succeeding sheet; and
    attaching an adhesive tape of an adhesive member to the end of the preceding sheet and the end of the succeeding sheet, which are arranged on the arrangement part of the arrangement member, so that the end of the preceding sheet is connected to the end of the succeeding sheet.

12. The electrode connecting method of claim 11, wherein a pathline is provided at the support position to indicate the support position at which the guide bar is positioned.

13. The electrode connecting method of claim 12, further comprising detecting the side portion of the preceding sheet and the side portion of the succeeding sheet, which are supported on the guide bar, by a detection member comprising a first detection sensor and a second detection sensor, respectively,
    wherein the side portion of the preceding sheet supported on the guide bar is detected by the first detection sensor, and the side portion of the succeeding sheet supported on the guide bar is detected by the second detection sensor.

14. The electrode connecting method of claim 12, further comprising, when the end of the preceding sheet and the end of the succeeding sheet arranged in the arrangement part are not matched, overlapping the end of the preceding sheet and the end of the succeeding sheet so that the non-matched portions are present in overlapping portions, and
    cutting the overlapping portions of the end of the preceding sheet and the end of the succeeding sheet by a cutting member and correspondingly matching the end of the preceding sheet with the end of the succeeding sheet.

15. The electrode connecting method of claim 12, comprising adhering and fixing the end of the preceding sheet and the end of the succeeding sheet to the arrangement part by a suction member.

* * * * *